United States Patent [19]
Woodard et al.

[11] Patent Number: 5,581,129
[45] Date of Patent: Dec. 3, 1996

[54] AUTOMATIC MFD KICKOUT SWITCH

[76] Inventors: Kenneth R. Woodard, 1507 Spring St., Allen, Tex. 75002; Lloyd D. Arthur, P.O. Box 841, Ralls, Tex. 79357

[21] Appl. No.: 43,211

[22] Filed: Apr. 5, 1993

[51] Int. Cl.$^6$ ............................. A01B 63/02; B60K 17/35
[52] U.S. Cl. ..................... 307/9.1; 172/2; 172/445; 180/249; 280/186; 307/38
[58] Field of Search ..................... 307/9.1, 10.1, 307/114, 125, 38; 180/338, 248, 249; 280/186, 189, 188, 455.1, 474; 293/DIG. 1; 172/445, 2, 3

[56] References Cited

U.S. PATENT DOCUMENTS

| | | | |
|---|---|---|---|
| 2,830,670 | 4/1958 | Ferguson | 180/338 |
| 4,396,087 | 8/1983 | Rock et al. | 172/2 |
| 4,982,799 | 1/1991 | Fujimoto et al. | 172/2 |
| 5,224,551 | 7/1993 | Sukup | 172/2 |

*Primary Examiner*—Jonathan Wysocki
*Assistant Examiner*—Richard T. Elms

[57] ABSTRACT

The MFD kickout switch controls the drive system on a tractor's front wheels in response to the controlled movement of a three point hitch. Tractors which are equipped with a system that disengages the front drive wheels when a tighter turning radius is needed can utilize the kickout switch to automatically disengage the front wheel drive when an associated three point hitch is raised.

2 Claims, 2 Drawing Sheets

AUTOMATIC MFD KICKOUT SWITCH

BACKGROUND OF THE INVENTION

1. Field of the Invention

The present invention relates to tractor controls, and more particularly pertains to a switch assembly which automatically disengages a front wheel drive associated with a tractor whenever the three point hitch is raised.

2. Description of the Prior Art

As is well known in the prior art, tractors used for plowing are provided with four wheel drive systems which can be manually disengaged. Additionally, such tractors are usually provided with three point hitches to which plows, cultivators, and other farm equipment can be attached, and these hitches can be selectively raised and lowered through powered control means. In normal operation, it is customary to disengage the four wheel drive of a tractor to achieve a tighter turning radius such as might be needed at the end of a plowed furrow, and at the same time raise the plow by activating the power raising mechanism associated with three point switch. This requires the operation of two different manual switching mechanisms which is sometimes difficult when a farmer is also trying to continually steer the tractor. As such, there appears to be a need for a simpler method of concurrently disengaging a front wheel drive and raising the three point hitch and in this respect, the present invention substantially addresses this need.

SUMMARY OF THE INVENTION

In view of the foregoing disadvantages inherent in the known types of tractor control mechanisms now present in the prior art, the present invention provides an improved tractor control mechamism wherein the same can be utilized to concurrently disengage a four wheel drive and raise a three point hitch. As such, the general purpose of the present invention, which will be described subsequently in greater detail, is to provide a new and improved tractor control switch assembly which has all the advantages of the prior art tractor control switch assemblies and none of the disadvantages.

To attain this, the MFD kickout switch controls the drive system on a tractor's front wheels in response to the controlled movement of a three point hitch. Tractors which are equipped with a system that disengages the front drive wheels when a tighter turning radius is needed can utilize the kickout switch to automatically disengage the front wheel drive when an associated three point hitch is raised.

There has thus been outlined, rather broadly, the more important features of the invention in order that the detailed description thereof that follows may be better understood, and in order that the present contribution to the art may be better appreciated. There are, of course, additional features of the invention that will be described hereinafter It is therefore an object of the present invention to provide a new and improved tractor control switch assembly which has all the advantages of the prior art tractor control switch assemblies and none of the disadvantages.

It is another object of the present invention to provide a new and improved tractor control switch assembly which may be easily and efficiently manufactured and marketed.

It is a further object of the present invention to provide a new and improved tractor control switch assembly which is of a durable and reliable construction.

An even further object of the present invention is to provide a new and improved tractor control switch assembly which is susceptible of a low cost of manufacture with regard to both materials and labor, and which accordingly is then susceptible of low prices of sale to the consuming public, thereby making such tractor control switch assemblies economically available to the buying public.

Still yet another object of the present invention is to provide a new and improved tractor control switch assembly which provides in the apparatuses and methods of the prior art some of the advantages thereof, while simultaneously overcoming some of the disadvantages normally associated therewith.

Still another object of the present invention is to provide a new and improved tractor control switch assembly. Yet another object of the present invention is to provide a new and improved tractor control switch assembly.

Even still another object of the present invention is to provide a new and improved tractor control switch assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
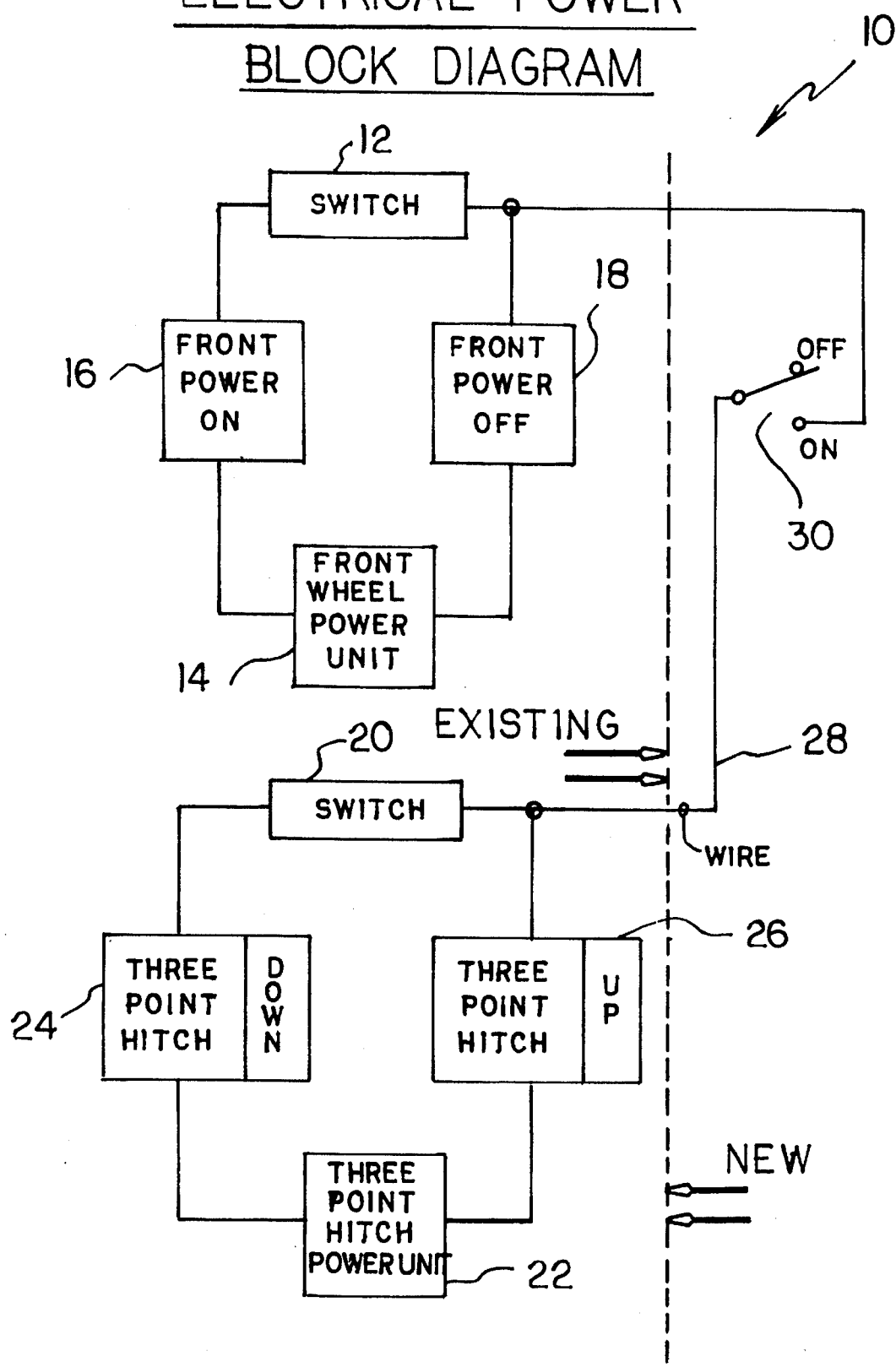
FIG. 1 is an electrical power block diagram illustrating the present invention.

With reference now to the drawings, and in particular to FIG. 1 thereof, a new and improved tractor control switching mechanism embodying the principles and concepts of the present invention and generally designated by the reference numeral 10 will be described.

In this respect, it will be noted that a conventional electrical power system for a tractor comprises a switch 12 for controlling the front wheel four wheel drive power unit 14 wherein such switch has a front wheel drive engagement function 16 and a front wheel drive disengagement function 18. By the same token, a further manually operable switch 20 is used to control a three point hitch power unit 22, with this switch having a three point hitch down mode 24 and a three point hitch up mode 26.

Recognizing that a user must manually operate both switches 12, 20 to respectively engage or disengage the front wheel drive 14 and to raise or lower the three point hitch 22, the present invention provides for a cutoff harness 28 and a kickout switch 30 to interconnect the switches 12, 20. Through the single manual operation of the switch 30, the front wheel drive and three point hitch positioning can be simultaneously controlled.

Figure 2:
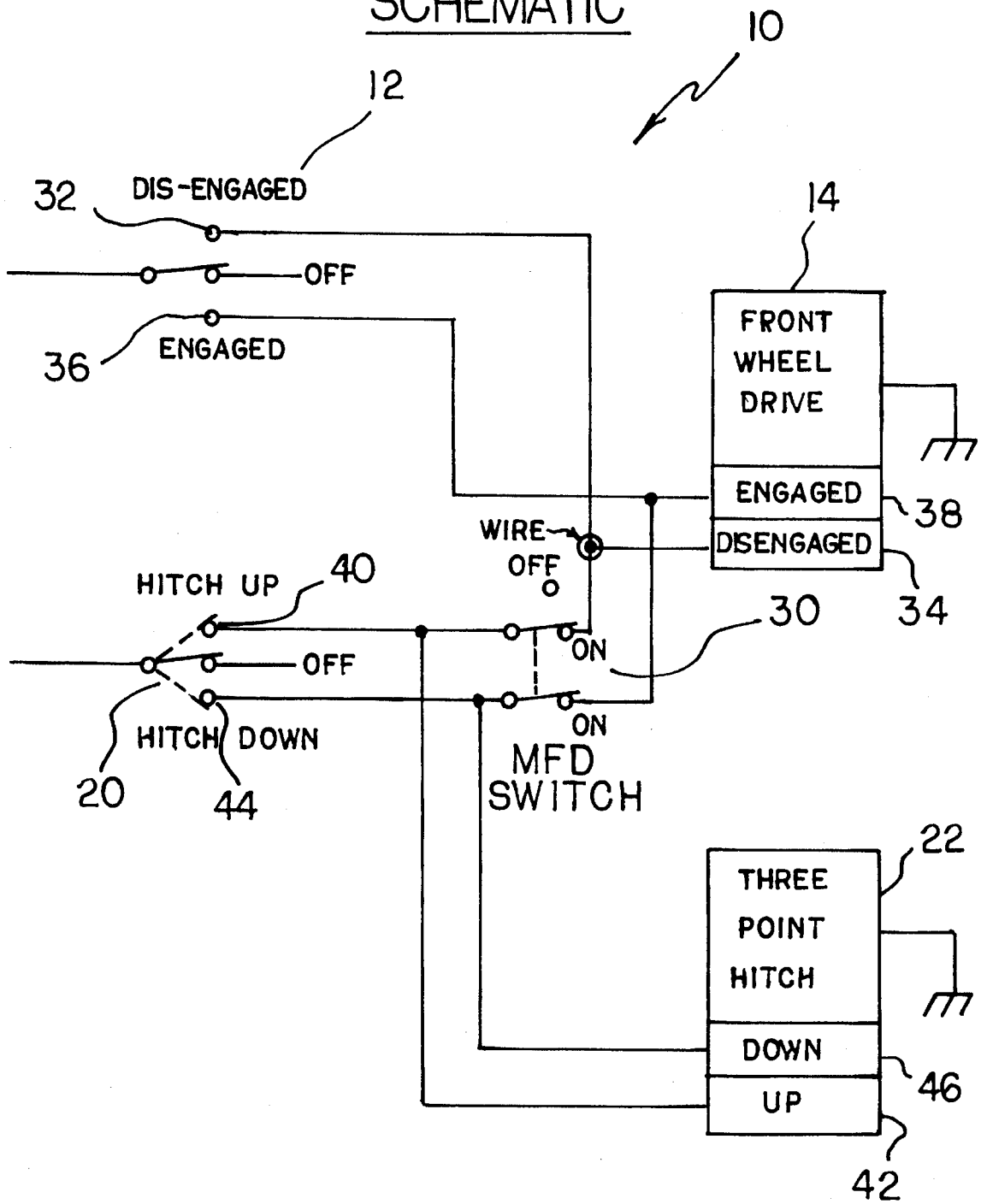
FIG. 2 is a front drive electrical system schematic illustrating the present invention.

FIG. 2 of the drawings illustrates a specific diagram of one preferred embodiment 10 of the invention. In this respect, an existing manually operable switch 12 for controlling the engagement or disengagement of the front wheel drive 14 is shown. When this switch is in the disengaged position 32, power is provided to the disengaged mechanism 34 associated with the front wheel drive 14. When the switch 12 is in the engaged position 36, power is supplied to the engaged control 38 forming a part of the front wheel drive assembly 14. This switch is normally manually operated by a tractor driver to control the engagement and disengagement of the front wheel drive 14.

A further existing switch 20 is used to control the three point hitch assembly 22. When the switch 20 is in the "hitch up" position 40, the power is provided to the up control module 42 associated with the three point hitch assembly 22. When the switch 20 is in the "hitch down" position 44, power is supplied to the down sensor control 46 associated with the three point hitch 22. This hitch is also normally manually operated by a tractor user during normal functioning of the tractor.

The present invention 10 utilizes the MFD (Mechanical Front Drive) switch 30 to facilitate a concurrent engagement or disengagement of the front wheel drive when the three point hitch 22 is lowered or raised. To achieve this, the switch 30 may be left engaged whereby an automatic mode of operation is achieved to provide concurrent activation of the front wheel drive 14 and the three point hitch 22. Recognizing that the tractor operator must still manually operate the hitch up and down mechanism through the use of switch 20, it can be seen that when the switch 20 is moved to the "hitch up" position, a switch 30 will allow power to be also delivered to the disengaged module 34 associated with the front drive 14. By the same token, when the tractor operator moves the switch 20 to the "hitch down" position 44, the switch 30 allows power to be delivered to the front wheel drive engaged module 38 forming a part of the front wheel drive assembly 14. As such, concurrent operation is achieved.

In an alternative embodiment, the invention could include a microswitch, an auxiliary power supply and a further cutoff harness. The microswitch could be mounted proximate the three point hitch assembly 22 so that when the hitch is raised, the microswitch would be closed to thereby produce a signal which is transferred to the front wheel drive control circuitry 14. A fuse or circuit breaker could be installed to prevent damage to the control circuitry in the event that the detection circuitry fails. A rectifier or diode could also be placed on the power connections to prevent damage to the electronics if the polarity of the power connections was accidentally reversed. A manual override switch could be utilized to allow the driver to deactivate the automatic system and control the front wheel drive system 14 independently of the operation of the three point hitch 22. Power for the detection circuitry could be supplied by the tractor's electrical system, or as mentioned, an optional self-contained battery power supply could be utilized. In the preferred embodiment, the electronics and battery would be housed within a durable weather tight plastic case designed to be mounted onto the tractor in a suitable location.

As to the manner of usage and operation of the present invention, that same should be apparent from the above description. Accordingly, no further discussion relating to the manner of usage will be provided.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed as being new and desired to be protected by Letters Patent of the United States is as follows:

1. A vehicle control mechanism comprising:

a front wheel four wheel drive power unit having an engaged control and a disengaged mechanism;

a three point hitch power unit having a three point hitch up mode and a three point hitch down mode;

an electrical power system for a tractor including a front wheel four wheel drive control switch electrically coupled to the front wheel four wheel drive power unit, the front wheel four wheel drive control switch including an off position, an engaged position effecting energization of the engaged control of the front four wheel drive power unit, and a disengaged position effecting energization of the disengaged mechanism of the front four wheel drive power unit, the electrical power system further comprising a three point hitch power unit switch electrically coupled to the three point hitch power unit, the three point hitch power unit switch including an off position, an up position effecting energization of the three point hitch up mode, and a down position effecting energization of the three point hitch down mode;

a manually operable MFD switch having an off position and an on position, the MFD switch electrically coupled between the three point hitch power unit switch and the front wheel four wheel drive control switch such that when the three point hitch power unit switch is positioned in the up position the disengaged mechanism of the front four wheel drive power unit will be energized, and when the three point hitch power unit switch is positioned in the down position the engaged control of the front four wheel drive power unit will be energized.

2. A vehicle control mechanism comprising:

a front wheel four wheel drive power unit having an engaged control and a disengaged mechanism;

a three point hitch power unit having a three point hitch up mode and a three point hitch down mode;

an electrical power system for a tractor including a front wheel four wheel drive control switch electrically couplable to a power source, the front wheel four wheel drive control switch having an engaged contact electrically coupled to the engaged control of the front wheel four wheel drive power unit, and a disengaged contact electrically coupled to the disengaged mechanism of the front wheel four wheel drive power unit, wherein the front wheel four wheel drive control switch can be positioned in an engaged position to electrically couple the power source to the engaged control of the front wheel four wheel drive power unit, and further wherein the front wheel four wheel drive control switch can be positioned in a disengaged position to electrically couple the power source to the disengaged mechanism of the front wheel four wheel drive power unit;

the electrical power system further comprising a three point hitch power unit switch couplable to a power source, the three point hitch power unit switch having a hitch up contact electrically coupled to the three point hitch up mode of the three point hitch power unit, and a hitch down contact electrically coupled to the three point hitch down mode of the three point hitch power unit, wherein the three point hitch power unit switch can be positioned in an up position to effect electrical coupling of the power source to the three point hitch up mode, and further wherein the three point hitch power unit switch can be positioned in a down position to effect electrical coupling of the power source to the three point hitch down mode;

a manually operable MFD switch having a first pair of contacts and a second pair of contacts, the first pair of contacts each electrically coupled to an individual one of the engaged contact and the hitch down contact, with the second pair of contacts each electrically coupled to an individual one of the disengaged contact and the hitch up contact, the MFD switch being closable to couple the first pair of contacts together and to couple the second pair of contacts together such that when the three point hitch power unit switch is positioned in the up position the disengaged mechanism of the front four wheel drive power unit will be coupled to the power source, and when the three point hitch power unit switch is positioned in the down position the engaged control of the front four wheel drive power unit will be coupled to the power source.

\* \* \* \* \*